United States Patent
Xie et al.

(10) Patent No.: US 10,449,709 B2
(45) Date of Patent: Oct. 22, 2019

(54) FABRICATION AND APPLICATION OF SHAPE MEMORY POLYMER POSSESSING TRANSESTERIFICATION INDUCED PERMANENT RESHAPING PROPERTY

(71) Applicant: ZHEJIANG UNIVERSITY, Hangzhou, Zhejiang Province (CN)

(72) Inventors: Tao Xie, Hangzhou (CN); Jingjun Wu, Hangzhou (CN); Qian Zhao, Hangzhou (CN); Weike Zou, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 197 days.

(21) Appl. No.: 15/323,397

(22) PCT Filed: Jul. 21, 2016

(86) PCT No.: PCT/CN2016/090801
§ 371 (c)(1),
(2) Date: Dec. 30, 2016

(87) PCT Pub. No.: WO2017/012560
PCT Pub. Date: Jan. 26, 2017

(65) Prior Publication Data
US 2017/0197356 A1    Jul. 13, 2017

(30) Foreign Application Priority Data
Jul. 23, 2015    (CN) .......................... 2015 1 0436041

(51) Int. Cl.
*B29C 61/06*        (2006.01)
*C08F 299/04*    (2006.01)
(Continued)

(52) U.S. Cl.
CPC ............ *B29C 61/06* (2013.01); *B29C 61/003* (2013.01); *C08F 299/04* (2013.01);
(Continued)

(58) Field of Classification Search
None
See application file for complete search history.

(56) References Cited

U.S. PATENT DOCUMENTS

| | | | | |
|---|---|---|---|---|
| 4,423,167 A | * | 12/1983 | Valko | C08G 63/12 204/501 |
| 2010/0240841 A1 | * | 9/2010 | Shimura | C08G 18/10 525/450 |

(Continued)

FOREIGN PATENT DOCUMENTS

| CN | 1563132 A | 1/2005 |
|---|---|---|
| CN | 101889039 A | 11/2010 |

*Primary Examiner* — Randy P Gulakowski
*Assistant Examiner* — Ha S Nguyen
(74) *Attorney, Agent, or Firm* — Jiwen Chen

(57) ABSTRACT

The present invention discloses the fabrication and application of a shape memory polymer possessing transesterification-induced permanent reshaping. The ester-containing crosslinked polymer is obtained by crosslinking ester bearing polymer precursors or by reaction of monomers which yield ester bonds. The transition temperature falls between 20-150° C. The reshaping temperature is tuned by catalyst amount and should be 20° C. above the transition temperature. The breakthrough of the present invention lies in integrating shape memory effect and plastic deformation into the same polymer and triggering the respective function at different occasions. The permanent shape of as synthesized polymer could be modified arbitrarily and cumulatively. Therefore, the hierarchical structure which could not otherwise be obtained due to the limit of mold fabrication process should expand the practical application of SMPs.

4 Claims, 4 Drawing Sheets

(51) Int. Cl.
    *C08G 59/24*    (2006.01)
    *C08G 18/42*    (2006.01)
    *C08G 18/24*    (2006.01)
    *C08G 18/20*    (2006.01)
    *C08G 18/16*    (2006.01)
    *C08G 59/42*    (2006.01)
    *C08G 18/78*    (2006.01)
    *C08G 18/76*    (2006.01)
    *C08G 67/04*    (2006.01)
    *C08G 63/91*    (2006.01)
    *B29C 61/00*    (2006.01)
    *B29K 67/00*    (2006.01)

(52) U.S. Cl.
    CPC ....... *C08G 18/165* (2013.01); *C08G 18/2072* (2013.01); *C08G 18/246* (2013.01); *C08G 18/4238* (2013.01); *C08G 18/4277* (2013.01); *C08G 18/7664* (2013.01); *C08G 18/7831* (2013.01); *C08G 18/7843* (2013.01); *C08G 59/245* (2013.01); *C08G 59/42* (2013.01); *C08G 63/912* (2013.01); *C08G 67/04* (2013.01); *B29K 2067/00* (2013.01); *C08G 2280/00* (2013.01)

(56) References Cited

U.S. PATENT DOCUMENTS

2011/0259517 A1    10/2011    Behl et al.
2017/0044361 A1*    2/2017    Duquenne .............. C08K 5/053

* cited by examiner

FABRICATION AND APPLICATION OF SHAPE MEMORY POLYMER POSSESSING TRANSESTERIFICATION INDUCED PERMANENT RESHAPING PROPERTY

This is a U.S. national stage application of PCT Application No. PCT/CN2016/090801 under 35 U.S.C. 371, filed Jul. 21, 2016 in Chinese, claiming priority of Chinese Application No. 201510436041.X, filed Jul. 23, 2015, all of which are hereby incorporated by reference.

TECHNICAL FIELD

The present invention belongs to the field of functional material and, more particularly, relates to application methods of the shape memory polymer possessing transesterification induced permanent reshaping.

BACKGROUND OF THE TECHNOLOGY

Shape memory polymer (SMP) is a kind of programmable smart material. Upon external stimuli, SMP could recover from a temporary shape to an original or a permanent shape. SMPs have been widely utilized as heat shrink tubes for cable industry and heat-shrink labels for packaging industry, and the later use achieved high level automation in traditional packaging industry.

Conventional SMPs could merely transform from one temporary shape to one permanent shape, and thus defined as dual-shape SMPs. The ability to lock the temporary shape lies in the phase transformation. Lendlein et al proposed a polymer material that undergoes two distinct phase transformation, each of which could fix an independent temporary shape and therefore achieved triple-shape memory effect (Lendlein, Proc. Natl. Acad. Sci. USA, 2006, 103, 18043). Xie Tao further discovered phase transformation with a broad transition temperature range, which could be tuned to fix more than two temporary shapes and accomplished multi-shape memory effect (Xie, Nature, 2010, 464, 267). These shape memory polymers mentioned above could recover to the permanent shape from the temporary shape upon heating, but never return to the temporary shape upon cooling without external force present. The irreversibility of the shape transformation categorizes those materials as one-way SMPs.

Progress in reversible shape memory polymer or two-way shape memory effect has been made remarkable progress in recent years. Several research groups reported the reversible shape change, that is cool-induced elongation and heat-induced contraction, which has been known for monodomain liquid crystalline elastomer with thermal treatment around the liquid crystal transition temperature, in cross-linked semicrystalline polymer. However, the reversible shape changes are confined to simple contraction or bending and thus the accessible shapes could not be arbitrarily programmed. Lendlein et al developed a polyurethane with two distinct crystalline phases in 2013. The crystalline phase with a lower transition temperature acted as the shape shifting phase and the other was designed for altering the permanent shape for during reversible change cycle and programmability was thus achieved (Lendlein, Adv. Mater., 2010, 22,3424).

However, the SMPs discovered so far are intrinsically compromised for their limited shape complexity, since the permanent shapes of the SMPs are dominantly determined by the processing mold, the cost of which would be extremely high for achieving complicated shapes. Moreover, the required chemical crosslinks for SMPs deprive them of the possibility for post-fabrication like thermoplastic polymers. Regular thermoplastics or thermosets would neither suffice for circumstances that multi-step shape modification or accumulated hierarchical shape is necessary.

SUMMARY OF THE INVENTION

The present invention discloses the fabrication and application method of shape memory polymers possessing transesterification-induced permanent reshaping. The permanent shape of the memory polymer as synthesized polymer could be modified multiple times cumulatively without any degradation of shape memory performance. The fabrication simplicity renders the invention a practical practice.

The conventional shape memory effect relies on the elastic deformation and reversible phase transformation of crosslinked polymer. The polymer chain is activated above the transition temperature (crystallization melting temperature or glass transition temperature) and entropy increased as a consequence of the deformation of the material. The infused energy could be temporarily stored under cooling and released once the chain's mobility regenerated as the heats implemented as a stimuli to trigger the shape recovery.

The present invention discloses a category of new SMPs possessing permanent reshaping property induced by embedded ester bonds which facilitate fast transesterification when necessary while the intrinsic phase transition temperature (e.g. glass transition or melting transition temperature) shall be responsible for shape memory effect. The activated transesterification would permanently alter the topographical structure of the deformed polymer under external forces while remaining at its highest entropic state. The activation temperature of transesterification is thus defined as the reshaping temperature at which the polymer experiences permanent network reconfiguration, also called plastic deformation. The ester bonds participating in transesterification could be obtained by crosslinking polymer precursors containing ester bonds or by reaction of appropriate monomers to create ester crosslinks. The transition temperature could be tuned by molecular structure at a range of 20-150° C. or even broader while the reshaping temperature is mainly modified by the catalyst for transesterification. To achieve thermally distinct shape memory effect and reshaping property, the reshaping temperature should be at least 20° C. higher than transition temperature. In particular embodiments, the transition and reshaping temperature should be 40-70° C. and 60-170° C., respectively.

When the ester bearing crosslinked polymer is obtained by crosslinking polymer precursor containing ester bonds, the potential polymer precursor can be chosen from saturated polyester polyols, saturated polyester with vinyl end groups, and unsaturated polyester.

Preferably, the saturated polyester polyol is chosen from polycaprolactone diol, polyethyleneglycol adipate, polyethyleneglycol-propyleneglycol adipate, polydiethyleneglycol adipate, poly-1,4-butyleneglycol adipate, polyethylene glycol-1,4-butylene glycol adipate, or a combination thereof. The crosslinking agents can be polyacid, polyisocyanate, and those that react with polyol. Advantageously, the crosslinking agents can be polyisocyanate, including but not limited to poly(hexamethylene diisocyanate), triphenylmethane-triisocyanate, HDI trimer.

Preferably, polycaprolactone diacrylate is chosen for the saturated polyester with vinyl end groups. The crosslinking agents could be thiol containing agents, including but not limited to pentaerythritol tetrakis(3-mercaptopropionate), pentaerythritol tetrakis(2-mercaptoacetate), Trimethylolpropane tris(3-mercaptopropionate), or a combination thereof.

Preferably, the unsaturated polyester is chosen from unsaturated polyester resin of phthalic type, terephthalic type, bisphenol A type, or flame-retardant unsaturated polyester and other specific functional unsaturated polyester resin. The crosslinking agents should contain vinyl groups, including but not limited to styrene, vinyl toluene, ethyl acrylate, methyl methacrylate, 1,2-divinylbenzene, diallyl phthalate, and triallyl cyanurate.

When the ester bonds are the reaction product of crosslinking process of non-ester bearing polymer precursor, the precursor could be epoxy resin. The potential optimized choices are phenolic epoxy resin, bisphenol A diglycidyl ether, bisphenol F diglycidyl ether, diglycidyl ether of tetrabromobispehol-A, 1,6-Hexanediol diglycidyl ether, bisphenol A ethylene glycol diglycidyl ether, epoxidized polyunsaturated fatty acid, epoxidized vegetable oils, or a combination thereof. The counterpart reactants for crosslinking reaction should be appropriate polyacids or anhydrides that react with epoxy to generate ester as the crosslinking sites. The polyacids are preferably chosen from fatty acids with 2-40 carbon (glutaric acid, adipic acid, heptanedioic acid, suberic acid, azaleas acid, decanedioicacid, dodecanedioic acid, etc.) and their combination, oligomer unsaturated fatty acids (undecylenic acid, palmitoleic acid, oleic acid, linoleic acid, α-Linolenic acid, ricinoleic acid, erucic acid, etc.), or aromatic diacids with 2-40 carbon (phthalate acid, trimellitic acid, terephthalic acid, naphthalic acid, etc.) and their combination. The potential choices for anhydrides cover o-phthalic anhydride, methyl Nadie anhydride, hexahydrophthalic anhydride, dodeceny succinicanhydride, glutaric anhydride, etc.) and their combination.

A catalyst should be added to the above-mentioned composition to induce the transesterification process. Preferably, the catalyst is chosen from 1,5,7-triazabicyclo[4.4.0]dec-5-ene, benzyldimethylamide, metal salts of tin, zinc, magnesium, cobalt, calcium, titanium and zirconium. The metal salt can be chlorate salt, sulfate, etc. The transesterification catalyst is at least 1% of the mass weight of the polymer system.

It should be pointed out that, during the process of formulating the present invention which proposes a crosslinking polymer with ester with elastic deformation function, ester-free inert polymer can be added into the polymer system, but the precursor of the polymer with ester must be more than 20% mass weight percentage.

The present invention achieves thermally distinct plastic and elastic deformation via the ester bearing polymer and independent tuning of the mutually exclusive effect.

The elastic deformation (shape memory effect): The ester remains deactivated above the transition temperature while below reshaping temperature (crystallization melting temperature or glass transition temperature). It is only the chain segment that is activated and the chain entropy increased as the macroscopic deformation of the material. The deformed material which could be fixed under cooling shall recover to the permanent shape driven by entropy at elevated temperature.

Plastic deformation (permanent network reconfiguration, or reshaping effect): Above the reshaping temperature, the activated transesterification of ester bonds permanently changes the network topography as an adaptation to the macroscopic deformation while the entropy remains constant and no longer triggers the recovery.

The application method of the shape memory polymers possessing transesterification induced reshaping property is provided in this disclosure, comprising the following steps:

(1) When the temperature reaches reshaping temperature, under the impact of an external force, the polymer with a certain original shape (shape I) is changed to an arbitrary desired new shape.

(2) The temperature and external force remain stable to allow the transesterification reactions in the polymer system until dynamic equilibrium is reached.

(3) The new shape is permanently fixed under cooling and now defined as the new original shape (shape II).

(4) The processed polymer is further altered to a temporary shape (shape III) after being heated above the phase transformation temperature under an external force.

(5) The temporary shape of step (4) shall be fixed after cooling below the phase transformation temperature.

(6) The polymer obtained from step (5) is reheated to above its the phase transformation temperature so that the polymer will recover to the permanent shape (shape II) obtained in step (3) from the temporary shape of step (5).

Step (1)-(3) cover the reshaping process of the shape memory polymers and 4-6 shape memory effect of the shape memory polymers. The reshaping effect could be implemented cumulatively at arbitrary lifetime of polymer in usage.

Comparing with the conventional shape memory polymers, the remarkable progress of the present invention includes:

The shape memory polymers of the present invention have the following advantages: The permanent shape could be adjusted arbitrarily and cumulatively. The complex shape originating from a mold fabricated conventional 2D or 3D shape could be further modified via the reshaping above the triggering temperature. The new shape is produced by plastic deformation and belongs to stable and non-recoverable (permanent) shape. More importantly, compared to conventional thermal plastic polymers, the plastic deformation of the polymers of the present invention can be cumulatively conducted. In other words, the shapes of the polymers can be cumulatively changed. This overcomes drawbacks of the traditional mold fabrication process that cannot achieve cumulative changes. The present invention is suitable to use in the shape memory polymers with original complex structure, significantly improves the application scope and has practical applications The shape memory polymers of the present invention have suitable phase transformation temperature and plastic deformation temperature, and can be suitable for various needs on the basis of convenience for polymers original shape processing.

The methods of the present invention are easy to operate, suitable for large scale industrialization. At the same time, the shape memory polymers is easy to process and reduces the cost of the original structure.

DETAILED EMBODIMENTS OF THE PRESENT INVENTION

Figure 1:
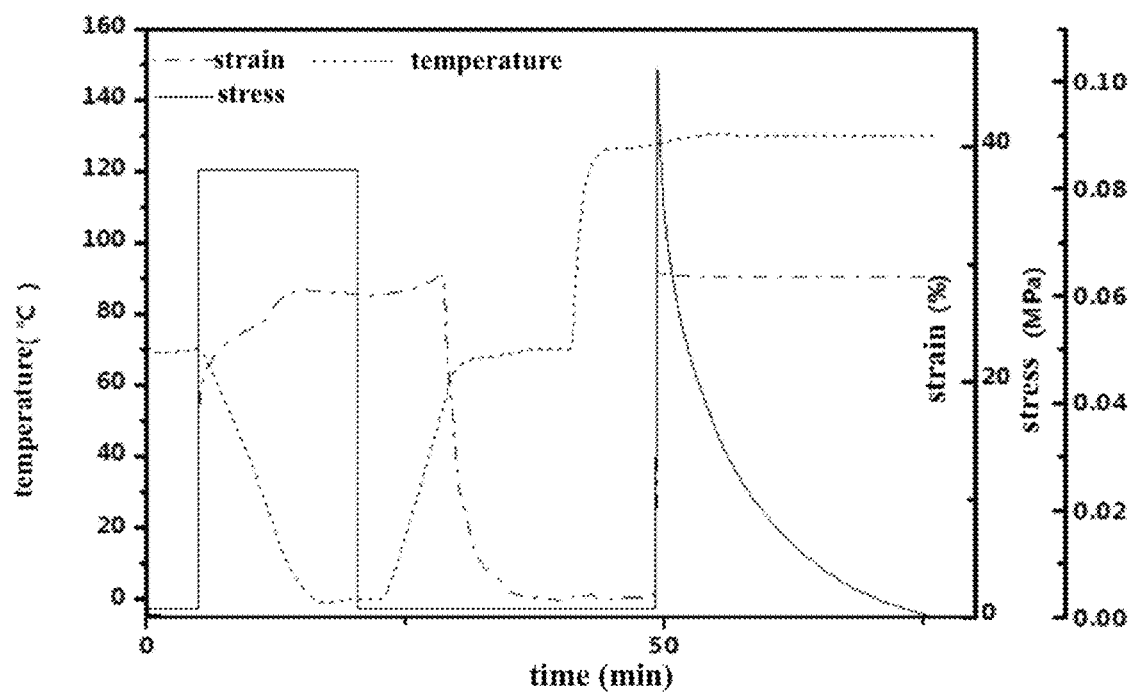
FIG. 1: DMA curve of thermo-adaptable SMP with synthesized as embodiment 1.

A further illustration of the invention is made with examples. The invention, however, demands protection of embodiment more than these examples.

Example 1

Materials:

a) Polycarprolactone diacrylate (PCLDA): Mw=10,000, from Sigma-Aldrich, molecular structure as follows:

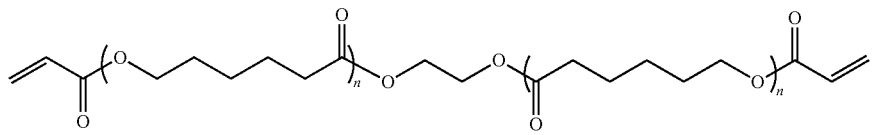

b) Pentaerythritol tetrakis(3-mercaptopropionate) (Tetrathiol): from Sigma-Aldrich, molecular structure as follows:

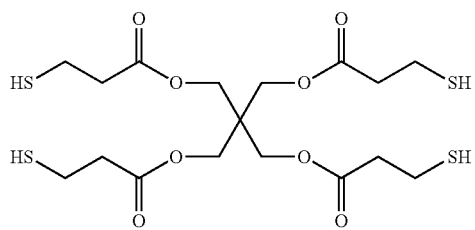 [SMILES: O=C(CCS)OCC(COC(=O)CCS)(COC(=O)CCS)COC(=O)CCS]

c) 1-Hydroxylcyclohexyl phenyl ketone (UV-184): from TCI Company d) 1,5,7-triazabicyclo[4.4.0]dec-5-ene (TBD): from TCI Company e) N,N-Dimethylformamide (DMF): from Aladdin (Shanghai) Co., Ltd.

Preparation Methods:

1 mmol of PCLDA and 0.5 mmol of Tetrathiol were added into 10 ml of DMF (wherein the mass ratio of PCLDA and Tetathiol is that the molar ration of double bond and mercapto (sulfanyl) group=1:1, molar ratio) and the temperature was elevated to 80° C. to obtain a thoroughly uniform solution. Then UV-184 (0.5% w.t.) and TBD (2% w.t.) were added in and the solution was further stirred. The solution was poured into a sealed glass mold and the mold was exposed under 365 nm UV for 5 min for curing. The obtained film was taken out and dried under vacuum for 24 hours at 100° C.

Example 2

Materials:

a) Polycarprolactone diacrylate (PCLDA): Mw=10,000, from Sigma-Aldrich b) Pentaerythritol tetrakis(3-mercaptopropionate) (Tetrathiol): from Sigma-Aldrich c) Triethylamine (TEA): from TCI Company d) 1,5,7-triazabicyclo[4.4.0]dec-5-ene (TBD): from TCI Company e) N,N-Dimethylformamide (DFM): from Aladin (Shanghai) Co., Ltd.

Preparation Methods:

1 mmol of PCLDA and 0.5 of mmol Tetrathiol were added into 20 ml of DMF (wherein the mass ratio of PCLDA and Tetathiol is that the molar ration of double bond and mercapto (sulfanyl) group=1:1, molar ratio) and the temperature was elevated to 80° C. obtain a uniform solution. Then TEA (0.5% w.t.) and TBD (2% w.t.) were added in and the solution was further stirred. The solution was poured into a sealed glass mold and the mold was placed at 60° C. oven for 4 hours for curing. The obtained film was taken out and dried under vacuum for 24 hours at 100° C.

Example 3

Materials:

a) Unsaturated polyester oligomer: phthalic acid type, 15% w.t. maleic anhydride b) Styrene: from Aladdin (Shanghai) Co., Ltd.

c) 1-Hydroxylcyclohexyl phenyl ketone (UV-184): from TCI Company d) Cobaltous naphthenate: from Aladin (Shanghai)

e) 1,5,7-triazabicyclo[4.4.0]dec-5-ene (TBD): from TCI Company

Preparation Methods:

6.5 g of unsaturated polyester oligomer (phthalic acid type, 15% w.t. maleic anhydride), 3.5 g of styrene, 0.1 g of UV-184, 0.05 g of cobaltous naphthenate and 0.2 g of TBD were mixed together and the uniform solution was poured into the aluminum plate then the plate was placed into the oven at 50° C. for 2 hours, followed by 80° C. for 5 hours to obtain the thermoset unsaturated polyester.

Example 4

Materials:

a) Bisphenol A diglycidyl ether (DGEBA): Mw=340, from Aladdin (Shanghai) Co., Ltd.

b) Glutaric anhydride: Mw=114, from Aladdin (Shanghai) Co., Ltd.

c) 1,5,7-triazabicyclo[4.4.0]dec-5-ene (TBD): from TCI Company d) N,N-Dimethylformamide (DFM): from Aladin (Shanghai) Co., Ltd.

Preparation Methods:

1 mmol of DGEBA and 1 mmol of glutaric anhydride were added into 20 ml of DMF and the temperature was elevated to 100° C. to get the thoroughly uniform solution. Then TBD (2%) was added in and the solution was further stirred. The solution was poured into a PTFE mold and the mold was placed at 130° C. oven for 4 hours for curing.

Example 5

Materials:
a) Polycarprolactone diol (PCL diol): Mw=10,000, from Sigma-Aldrich, molecular structure as follows:

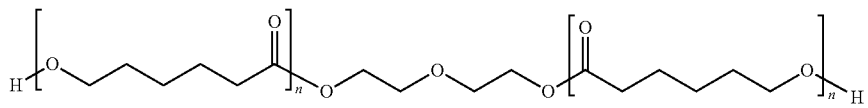

b) Hexamethylene diisocyanate (HDI): from Sigma-Aldrich, CAS: 28182-81-2, molecular structure as follows:

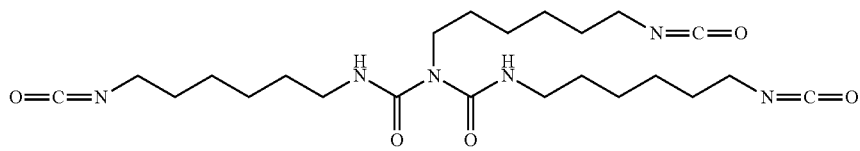 [SMILES: O=C=NCCCCCCNC(=O)N(CCCCCCN=C=O)C(=O)NCCCCCCN=C=O]

c) Dibutyltin dilaurate (DBTDL): from TCI Company
d) 1,5,7-triazabicyclo[4.4.0]dec-5-ene (TBD): from TCI Company
e) N,N-Dimethylformamide (DFM): from Aladdin (Shanghai) Co., Ltd.

Preparation Methods:

0.3 mmol of PCL and 0.2 mmol of HDI were added into 10 ml of DMF (wherein the mass ratio of PCL and HDI is that the molar ration of hydroxy and isocynate group: hydroxy:isocynate=1:1, molar ratio) and elevate the temperature to 80° C. to get the thoroughly uniform solution. Then DBTDL (0.5% w.t.) and TBD (2% w.t.) were added in and the solution was further stirred. The solution was poured into a mold and the mold was placed at 90° C. for 12 hours for curing. The obtained film was taken out and dried under vacuum for 24 hours at 100° C.

Example 6

Materials:
a) Polycarprolactone diol (PCL diol): Mw=10,000, from Sigma-Aldrich, molecular structure as follows:
b) triphenylmethane-4,4',4''-triisocyanate: from Sigma-Aldrich
c) Dibutyltin dilaurate (DBTDL): from TCI Company
d) 1,5,7-triazabicyclo[4.4.0]dec-5-ene (TBD): from TCI Company
e) N,N-Dimethylformamide (DFM): from Aladdin (Shanghai) Co., Ltd.

Preparation Methods:

0.3 mmol of PCL and 0.2 mmol of triphenylmethane-4,4',4''-triisocyanate were added into 10 ml DMF (wherein the mass ratio of PCL and triphenylmethane-4,4',4''-triisocyanate is that the molar ration of hydroxy and isocynate group: hydroxy:isocynate=1:1, molar ratio) and the temperature was elevated to 80° C. to get the thoroughly uniform solution. Then DBTDL (0.5% w.t.) and TBD (2%) were added in and the solution was further stirred. The solution was poured into a mold and the mold was placed at 90° C. for 12 hours for curing. The obtained film was taken out and dried under vacuum for 24 hours at 100° C.

DSC (Differential scanning calorimetry) tests showed the transition temperature of synthesized samples of Examples 1-6 falls between 50-100° C. DMA (Dynamic mechanical analysis) stress relaxation tests indicated the higher the temperature, the faster complete plastic deformation was achieved. Several minutes or hours might be needed to complete relaxation at 130° C.

The sample for DMA test was cut from the film by laser engraver machine. Followed practice is characterization procedure for plasticity and shape memory performance for Example 1 to obtain FIG. 1.

Shape memory effect: Stretch the sample at 70° C. until the stress reached 120 MPa and then cooled the sample to 0° C. and removed the internal force. This fixed the temporary shape. The sample in this temporary shape should recover to the original shape upon 70° C.

Reshaping: The sample was stretched to a constant length isothermally and the stress was allowed to relax completely as enabled by transesterification.

Figure 2:
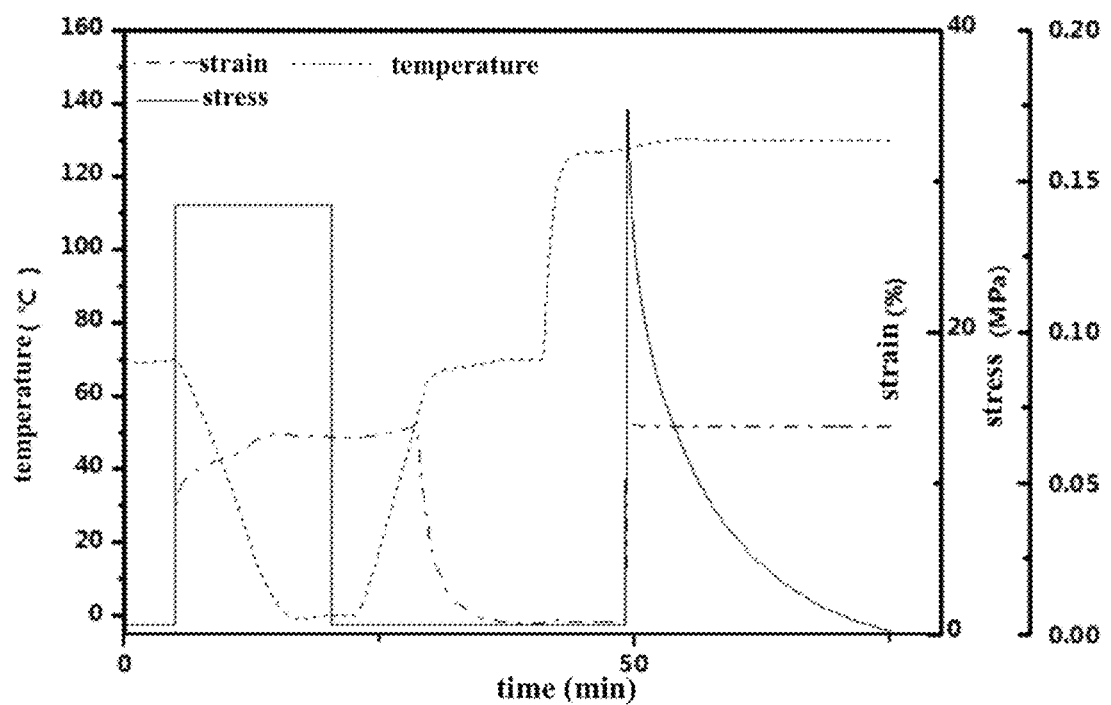
FIG. 2: DMA curve of thermo-adaptable SMP with synthesized as embodiment 2.
Figure 3:
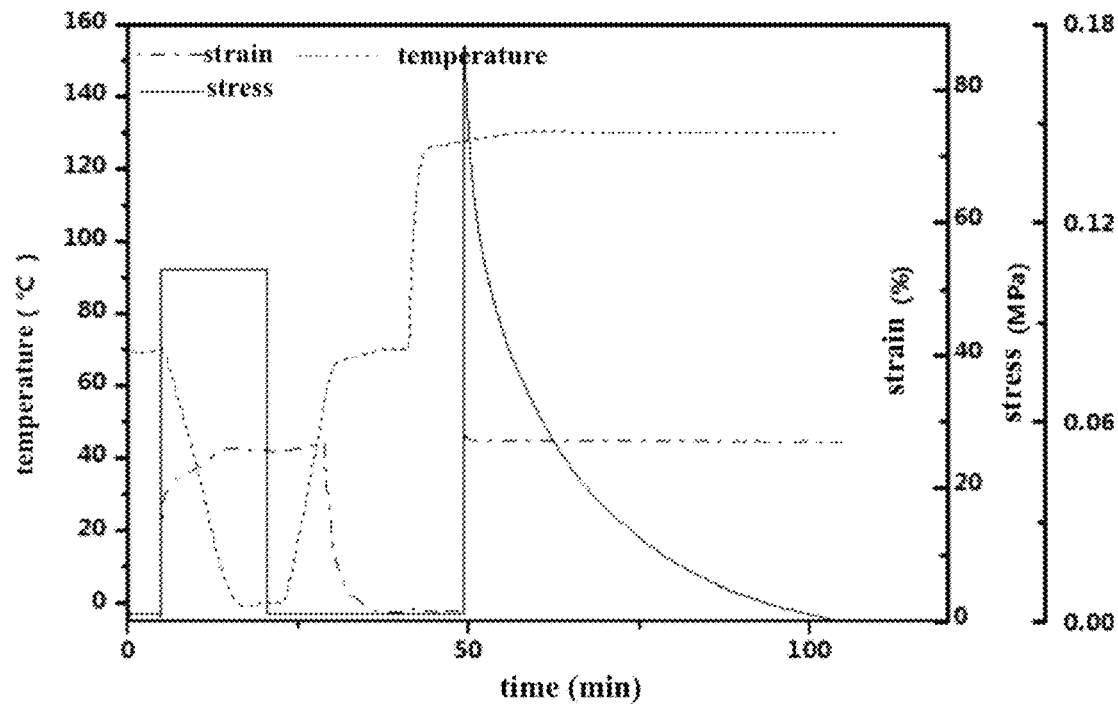
FIG. 3: DMA curve of thermo-adaptable SMP with synthesized as embodiment 3.
Figure 4:
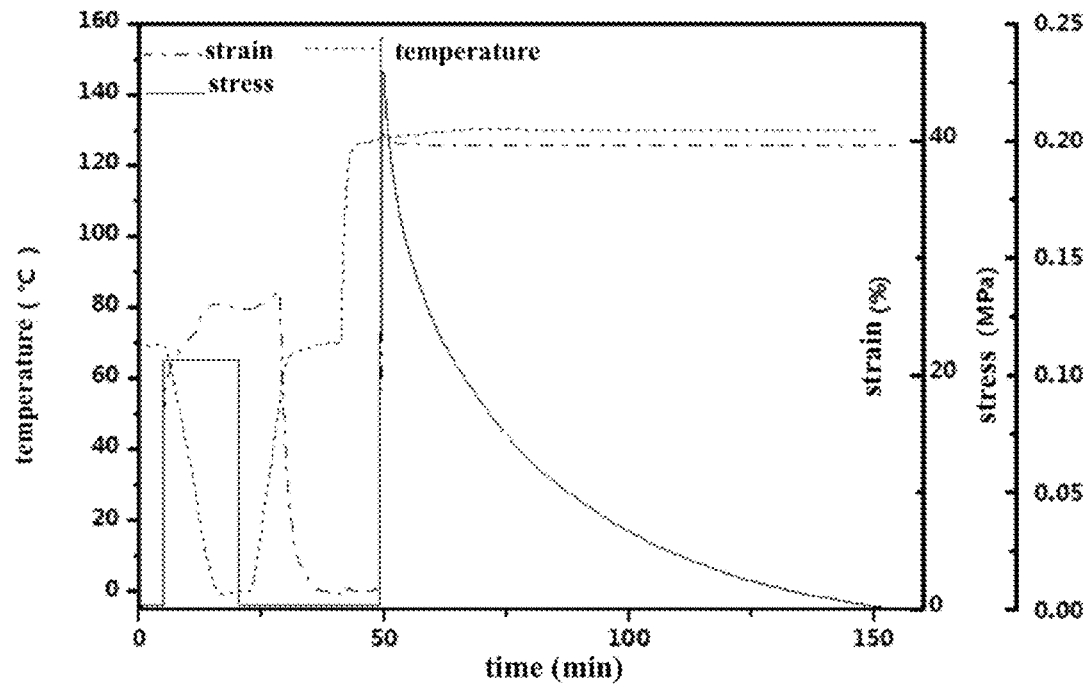
FIG. 4: DMA curve of thermo-adaptable SMP with synthesized as embodiment 4.
Figure 5:
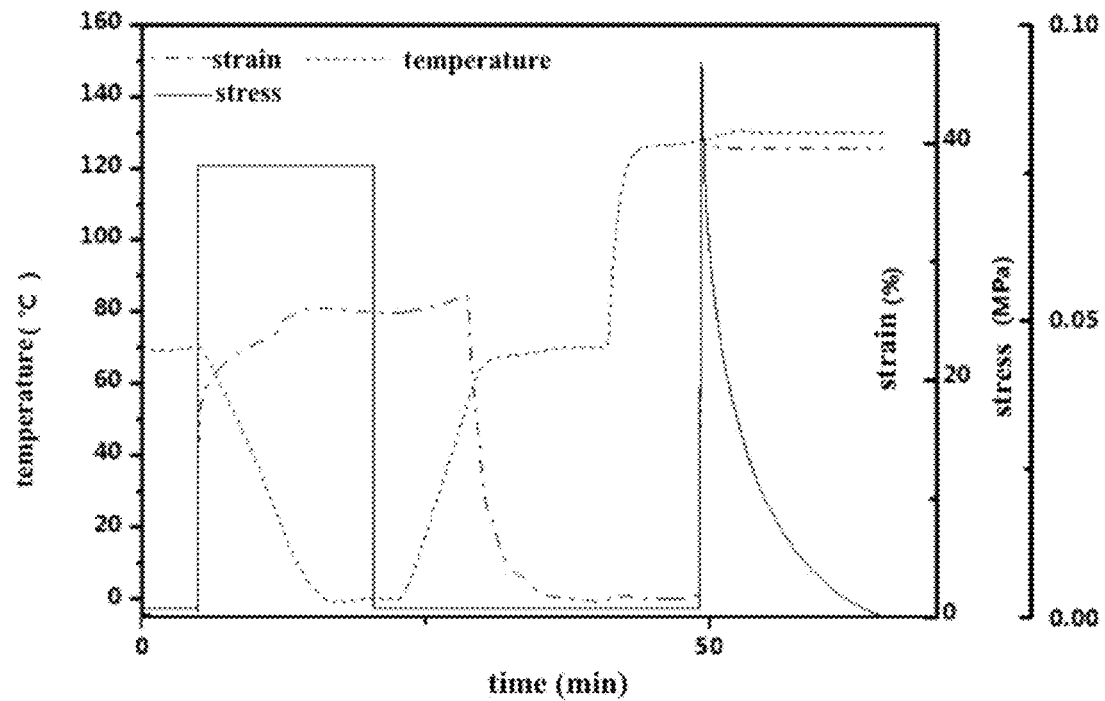
FIG. 5: DMA curve of thermo-adaptable SMP with synthesized as embodiment 5.
Figure 6:
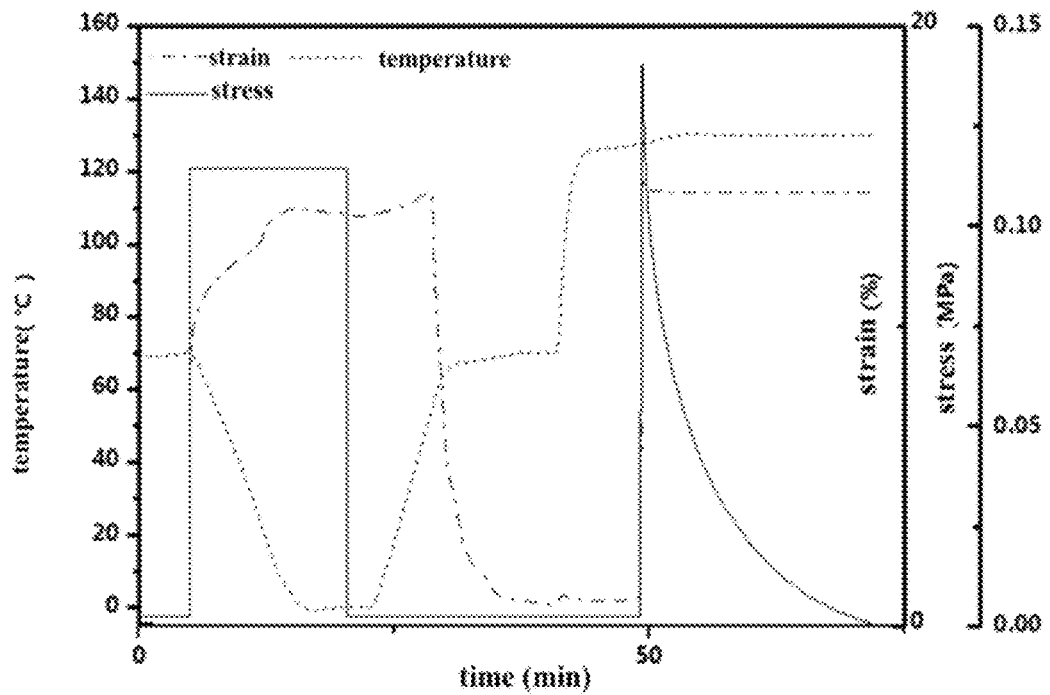
FIG. 6: DMA curve of thermo-adaptable SMP with synthesized as embodiment 6.

FIG. 2 shows the performance of reshaping and shape memory effect of Example 2. FIG. 3 shows the performance of reshaping and shape memory effect of Example 3. FIG. 4 shows the performance of reshaping and shape memory effect of Example 4. FIG. 5 shows the performance of reshaping and shape memory effect of Example 5. FIG. 6 shows the performance of reshaping and shape memory effect of Example 6.

Figure 7:
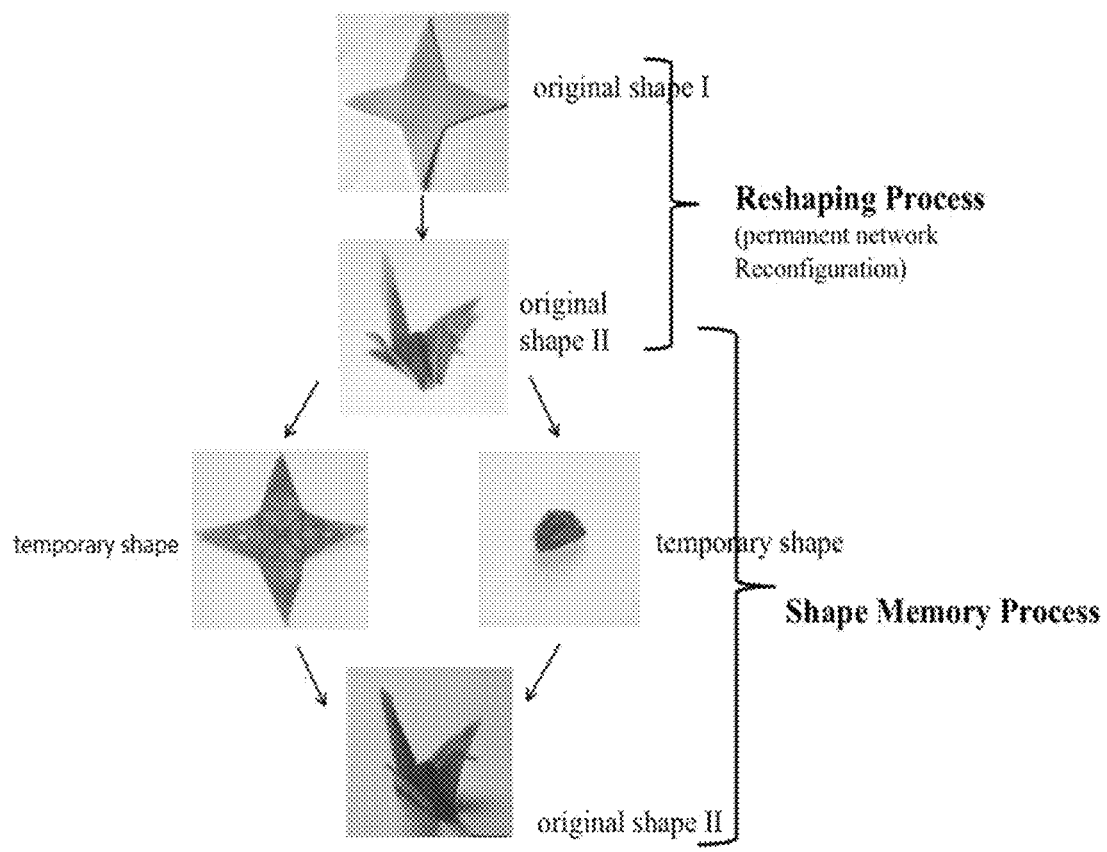
FIG. 7 shows the detailed application process of embodiment 1.

An application process of the invention is demonstrated as follows:

As FIG. 7 shows, the sample from Example 1 was cut into a specific shape, the sample was heated to 130° C. and then the sample was folded into a crane. A permanent crane shape was obtained after certain time. The crane was heated above the phase transition temperature to deform the crane into a sheet of paper (temporary shape I) or arbitrary (temporary shape II) and the sample was cooled to fix the temporary shape. The material of arbitrary temporary shape shall recover to the crane above the transition temperature.

Example 7-9

The polycaprolactone idol in Example 5 was replaced with polyethyleneglycol-propyleneglycol adipate, polydiethyleneglycol adipate, poly-1,4-butyleneglycol adipate and the isocyanate-hydroxyl crosslinking chemistry was applied. The test showed the as-prepared sample exhibits reshaping and shape memory effect and a similar transition temperature of sample from Example 5. While the resolution of the permanent shape obtained from the reshaping process was less satisfied compared with Example 5, it shall be as well acceptable for occasions that requires no such accuracy.

Example 10-11

The pentaerythritol tetrakis(3-mercaptopropionate) was replaced with pentaerythritol tetrakis(2-mercaptoacetate) in Examples 1 and 2, a similar result as Examples 1 and 2 was obtained.

Example 12

The glutaric anhydride was replaced with decane-dioicacid, a similar result as Example 4 was obtained.

The invention claimed is:

1. An application method of a shape memory polymer possessing transesterification-induced permanent reshaping property, the method comprising the steps of:
   (1) when the temperature reaches reshaping temperature, under the impact of an external force, the polymer with a certain original shape is changed to an arbitrary desired new shape (shape I);
   (2) the temperature and external force remain stable to allow the transesterification reactions in the polymer system until dynamic equilibrium is reached;
   (3) the new shape is fixed under cooling and now defined as the new original shape (shape II);
   (4) the processed polymer is further altered to a temporary shape (shape III) after being heated above the phase transformation temperature under an external force;
   (5) the temporary shape of step (4) shall be fixed after cooling below the phase transformation temperature;
   (6) the polymer obtained from step (5) is reheated to above its the phase transformation temperature so that the polymer will recover to the fixed shape (shape II) obtained in step (3) from the temporary shape of step (5);
   wherein the shape memory polymers are crosslinked polymers with ester bonds and with a transesterification catalyst present;
   wherein the catalyst is selected from the group consisting of 1,5,7-triazabicyclo[4.4.0]dec-5-ene, benzyldimethylamide, and metal salts of tin, zinc, magnesium, cobalt, calcium, titanium, or zirconium;
   wherein the crosslinked polymers with ester bonds are obtained by crosslinking reaction of crosslinking polymer precursors containing ester bonds or obtained by reaction of two or more crosslinking polymer precursors without ester bonds to form ester bonds; phase transition temperature of the polymers is 20-150° C.; reshaping temperature is at least 20° C. higher than the phase transition temperature;
   wherein the ester-containing crosslinked polymer is obtained by reaction of epoxy monomers and organic polyacids or anhydrides.

2. The method of claim 1, wherein the phase transition temperature of the polymers is 40-70° C.; and the reshaping temperature is 100-140° C.

3. The method of claim 1, wherein the phase transformation temperature is glass transition or melting temperature of the polymers.

4. An application method of a shape memory polymer possessing transesterification-induced permanent reshaping property, the method comprising the steps of:
   (1) when the temperature reaches reshaping temperature, under the impact of an external force, the polymer with a certain original shape is changed to an arbitrary desired new shape (shape I);
   (2) the temperature and external force remain stable to allow the transesterification reactions in the polymer system until dynamic equilibrium is reached;
   (3) the new shape is fixed under cooling and now defined as the new original shape (shape II;
   (4) the processed polymer is further altered to a temporary shape (shape III) after being heated above the phase transformation temperature under an external force;
   (5) the temporary shape of step (4) shall be fixed after cooling below the phase transformation temperature;
   (6) the polymer obtained from step (5) is reheated to above its the phase transformation temperature so that the polymer will recover to the fixed shape (shape II) obtained in step (3) from the temporary shape of step (5);
   wherein the shape memory polymers are crosslinked polymers with ester bonds and with a transesterification catalyst present;
   wherein the catalyst is selected from the group consisting of 1,5,7-triazabicyclo[4.4.0]dec-5-ene, benzyldimethylamide, and metal salts of tin, zinc, magnesium, cobalt, calcium, titanium, or zirconium;
   wherein the crosslinked polymers with ester bonds are obtained by crosslinking reaction of crosslinking polymer precursors containing ester bonds or obtained by reaction of two or more crosslinking polymer precursors without ester bonds to form ester bonds; phase transition temperature of the polymers is 20-150° C.; reshaping temperature is at least 20° C. higher than the phase transition temperature;
   wherein the ester-containing crosslinked polymer is obtained by crosslinking a saturated polyester with vinyl end groups.

* * * * *